United States Patent
Wang et al.

(10) Patent No.: US 11,535,400 B2
(45) Date of Patent: Dec. 27, 2022

(54) FAIRING SKIN REPAIR METHOD BASED ON MEASURED WING DATA

(71) Applicant: NANJING UNIVERSITY OF AERONAUTICS AND ASTRONAUTICS, Jiangsu (CN)

(72) Inventors: Jun Wang, Jiangsu (CN); Xiaoge He, Jiangsu (CN); Yuanpeng Liu, Jiangsu (CN); Yuan Zhang, Jiangsu (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 54 days.

(21) Appl. No.: 17/169,505

(22) Filed: Feb. 7, 2021

(65) Prior Publication Data
US 2021/0347501 A1 Nov. 11, 2021

(51) Int. Cl.
*B64F 5/40* (2017.01)
*G06T 7/33* (2017.01)
(Continued)

(52) U.S. Cl.
CPC ............ *B64F 5/40* (2017.01); *G05B 19/4097* (2013.01); *G06K 9/622* (2013.01); *G06K 9/6215* (2013.01);
(Continued)

(58) Field of Classification Search
CPC ....... B64F 5/40; G01B 11/24; G05B 19/4097; G05B 2219/37558; G06T 2207/10028;
(Continued)

(56) References Cited

U.S. PATENT DOCUMENTS

2018/0204338 A1* 7/2018 Narang ............... G06T 7/74
2020/0410690 A1* 12/2020 Zeng ................... G06T 7/33

FOREIGN PATENT DOCUMENTS

| CN | 103236064 A | 8/2013 |
| CN | 104008257 A | 8/2014 |

(Continued)

OTHER PUBLICATIONS

Qian Xie, Dening Lu, Kunpeng Du, Jinxuan Xu, Jiajia Dai, Honghua Chen and Jun Wang; Aircraft Skin Rivet Detection Based on 3D Point Cloud via Multiple Structures Fitting; Mar. 31, 2020; Nanjing University of Aeronautics and Astronautics, Nanjing, China.

(Continued)

*Primary Examiner* — Dakshesh D Parikh

(57) ABSTRACT

A fairing skin repair method based on measured wing data includes fairing skin registration. Data set P1 through denoising and filtering wing point cloud data is reorganized to obtain a key point set P. A histogram feature descriptor in a normal direction of any key point in set P and a skin point cloud data Q is calculated. Euclidean distance between feature descriptors of two points is calculated through K-nearest neighbor algorithm, and points with high similarity are added into a set M. A clustering is performed on set M using a Hough voting algorithm to obtain a local point cloud set P' in set P. The method includes fairing skin repair. The boundary line of the point frame is projected onto Q, and a distance between a projection line on the point cloud and the boundary line is calculated to obtain an amount of skin to be repaired.

8 Claims, 3 Drawing Sheets

(51) Int. Cl.
  *G05B 19/4097* (2006.01)
  *G06K 9/62* (2022.01)
  *G06T 5/00* (2006.01)
  *G06V 10/75* (2022.01)
  *G06V 10/48* (2022.01)
  *G06V 10/77* (2022.01)

(52) U.S. Cl.
  CPC ............ *G06K 9/6247* (2013.01); *G06T 5/002* (2013.01); *G06T 7/33* (2017.01); *G06V 10/48* (2022.01); *G06V 10/758* (2022.01); *G06V 10/77* (2022.01); *G05B 2219/37558* (2013.01); *G06T 2207/10028* (2013.01); *G06T 2207/30108* (2013.01)

(58) Field of Classification Search
  CPC . G06T 2207/30108; G06T 2207/30136; G06T 2207/30164; G06T 5/002; G06T 7/001; G06T 7/33; G06K 9/6215; G06K 9/622; G06K 9/6247; G06V 10/48; G06V 10/758; G06V 10/764; G06V 10/77; G06V 40/10
  See application file for complete search history.

(56) References Cited

FOREIGN PATENT DOCUMENTS

| | | | | | |
|---|---|---|---|---|---|
| CN | 105654483 | A | * | 6/2016 | |
| CN | 105868498 | A | | 8/2016 | |
| CN | 106952297 | A | * | 7/2017 | ............... G06T 9/00 |
| CN | 105976312 | B | | 3/2019 | |
| CN | 208665528 | U | * | 3/2019 | ............... B64C 7/00 |
| CN | 109685080 | A | * | 4/2019 | ........... G06K 9/4633 |
| CN | 109887015 | A | | 6/2019 | |
| CN | 109919984 | A | | 6/2019 | |
| CN | 110008207 | A | | 7/2019 | |
| CN | 110348310 | A | | 10/2019 | |
| CN | 111080627 | A | | 4/2020 | |
| CN | 109887015 | B | * | 6/2022 | |
| EP | 3637230 | A1 | | 4/2020 | |

OTHER PUBLICATIONS

Yang Jiaolong, Huang Xiang, Li Shuanggao, Xiong Tianchen, Zhao Ziyue; Method for Extracting Repair Amount of Skin Seam Based on Scan Line Point Cloud; Dec. 31, 2019; Nanjing University of Aeronautics and Astronautics.

* cited by examiner

FAIRING SKIN REPAIR METHOD BASED ON MEASURED WING DATA

CROSS-REFERENCE TO RELATED APPLICATIONS

This application claims the benefit of priority from Chinese Patent Application No. 202010385403.8, filed on May 9, 2020. The content of the aforementioned applications, including any intervening amendment thereto, is incorporated herein by reference in its entirety.

TECHNICAL FIELD

This application relates to three-dimensional model processing, and more particularly to fairing skin repair method based on measured wing data.

BACKGROUND

An aircraft is generally manufactured by assembling parts into subcomponents and then components to form a fuselage and wings, and finally assembling the fuselage and the wings together. Assembling wings and fuselage is an important action for the aircraft assembly after which the fairing skin repair is very important.

Aircraft skin parts are widely used in the wings and fuselage, accounting for about 30% of the entire sheet metal part, and they usually have complex and diverse shapes and large dimensions. The skin is an important component to constitute the aerodynamic shape of the aircraft. The skin manufacturing not only requires the shape accuracy and mechanical performance, but also has strict requirements on the surface quality. Currently, during a skin repair, the repairing allowance is gradually adjusted through manual comparison, marking and final comparison. The adjustment is labor intensive and has a low efficiency. In addition, the accuracy of skin repair is difficult to guarantee.

SUMMARY

Aiming at the defects in the prior art, the present disclosure provides a fairing skin repair method based on measured wing data.

The technical solutions of the present disclosure are described as follows.

A fairing skin repair method based on measured wing data, comprising:

S1) carrying out a fairing skin registration, comprising:
S101) obtaining skin point cloud data Q;
S102) performing denoising and voxel grid filtering on a known point cloud data of docked wing to obtain a data set P1; reorganizing the data set P1 through a data reorganization method to obtain a key point set P; and calculating a normal line of each key point in the key point set P;
S103) calculating a histogram feature descriptor in a normal direction of any key point in the key point set P and a histogram feature descriptor in a normal direction of any point in the skin point cloud data Q, respectively;
S104) calculating a Euclidean distance between feature descriptors of two points through a K-nearest neighbor algorithm; searching similar histogram feature descriptors; adding points with high similarity to a set M; and initially setting the set M as an empty set;
S105) performing a clustering on the set M using a Hough voting algorithm to obtain a local point cloud set P' in the key point set P that matches the skin point cloud data Q; and
S106) matching the skin point cloud data Q with the local point cloud set P' through an iterative closest point algorithm; and
S2) carrying out a fairing skin repair.

In some embodiments, in step (S101), a skin uniformly manufactured in a factory is scanned using a three-dimensional laser scanner, so as to collect the skin point cloud data Q.

In some embodiments, the step (S102) comprises:
S102-1) preprocessing the known point cloud data of the docked wing to eliminate noise points that deviate from a contour;
S102-2) filtering the preprocessed point cloud data of the docked wing through voxel grid filtering to obtain the data set P1;
S102-3) taking a nearest neighbor of any key point in the data set P1, performing a search through a k-nearest neighbor algorithm—the data reorganization method to reorganize the data set P1 according to a tree structure, so as to obtain the key point set P; and
S102-4) reducing dimensionality of each adjacent point of the key point set P from a three-dimensional plane to a two-dimensional plane through principal component analysis; wherein the two-dimensional plane is a tangent plane of the adjacent point, and a normal line of the tangent plane is the normal line of the corresponding key point.

In some embodiments, the step (S103) comprises:
S103-1) calculating a local feature descriptor $m_i$, i=1, 2, 3, . . . , k in a normal direction of any key point in the key point set P, wherein k is the number of key points in the key point set;

wherein the step (S103-1) comprises:
taking any key point in the key point set P as a center; constructing a spherical area with a self-set radius; dividing grids along three directions of radial, azimuth, and elevation; wherein the spherical area is divided into 32 spatial areas through dividing along the radial direction 2 times, the azimuth direction 8 times, and the elevation direction 2 times;
in each spatial region, calculating a cosine of an angle between a normal line $n_N$ of any point in the spatial region and a normal line $n_i$ of a key point $p_i$: $\cos \theta = n_N \cdot n_i$; wherein N is the number of points in the spatial region; and
performing a histogram statistic on the number of points falling into each spatial region according to the cosine value to obtain the local feature descriptor $m_i$ of the normal direction of the key point;
S103-2) calculating a local feature descriptor $m_j$, j=1, 2, 3, . . . , l in a normal direction of any point in the skin point cloud data Q using a same method, wherein l is the number of key points in the skin point cloud data Q.

In some embodiments, the step (S104) comprises:
S104-1) inputting the local feature descriptor $m_i$ of the histogram of the key point set P using KdTree; and performing a nearest neighbor searching using fast library for approximate nearest neighbors (FLANK);
S104-2) among all the points in the skin point cloud data Q, searching a point whose matching distance from any key point in the key point set P is less than a Euclidean distance $\sigma$, that is, a feature point: $\sigma = 0.3$; and
S104-3) putting all the feature points whose matching distance is less than $\sigma$ into the set M.

In some embodiments, the step (S105) comprises:

S105-1) calculating a local reference frame for the feature points in the skin point cloud data Q and the feature points in the key point set P;

S105-2) performing a clustering using the Hough voting algorithm; for the input feature points of the skin point cloud data Q and the input feature points of the key point set P, setting a size of a Hough peak point in a Hough space as a threshold; and S105-3) matching the set M, according to the threshold set in step (S105-2), identifying a final cluster set, that is, the local point cloud set P'.

In some embodiments, the step (S106) comprises:

S106-1) matching the skin point cloud data Q with the locked local point cloud set P' using the iterative closest point algorithm;

wherein the step (S106) comprises:

calculating a corresponding near point, that is, a corresponding point pair of any key point in the key point set P in the skin point cloud data Q; obtaining a rigid body transformation T that minimizes an average distance of the corresponding point pair; obtaining a translation parameter $\omega$ and a rotation parameter r; transforming the key point set P according to the translation parameter $\omega$ and a rotation parameter r to obtain a new transformed point set P'''; wherein if the new transformed point set P''' and the skin point cloud data Q satisfy that an average distance between the two point sets is less than a given threshold, a result after coarse registration will be obtained; and S106-2) filtering out wrong points in the coarse registration using a global hypothesis verification algorithm, so as to finish a skin registration.

In some embodiments, the step (S2) comprises:

S201) extracting a boundary line of a point cloud frame of the wing and the skin point cloud data Q after coarse registration using a random sample consensus (RANSAC) extraction algorithm;

S202) projecting the boundary line of the point frame onto the skin point cloud data Q; calculating a distance between a projection line on the point cloud and the boundary line, so as to obtain an amount of skin to be repaired; and S203) cutting the skin according to the amount of skin to be repaired; and finishing the repair.

The beneficial effects of the present disclosure are described as follows.

In the present disclosure, fairing skin registration and fairing skin repair are completed through collecting the skin point cloud data and the wing point cloud data by means of a computer program. In this way, manpower is greatly saved, and the production efficiency is improved. In addition, without the influence of subjective factors, the registration result is more accurate. The staff can repair the skin according to an amount of skin to be repaired and effectively finish the repair.

DETAILED DESCRIPTION OF EMBODIMENTS

A fairing skin repair method based on measured wing data of the present disclosure will be further described clearly with reference to the accompanying drawings and embodiments.

Figure 1:
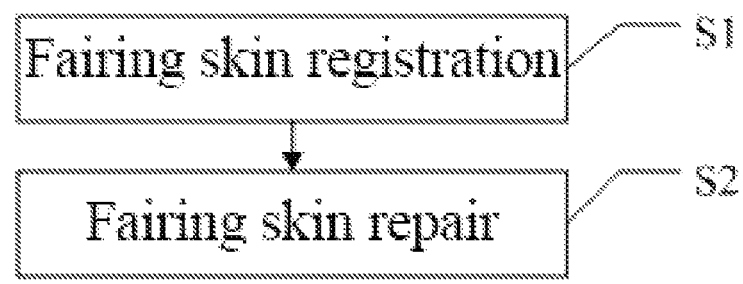
FIG. 1 is a flowchart of a fairing skin repair method based on measured wing data according to an embodiment of the present disclosure.
Figure 2:
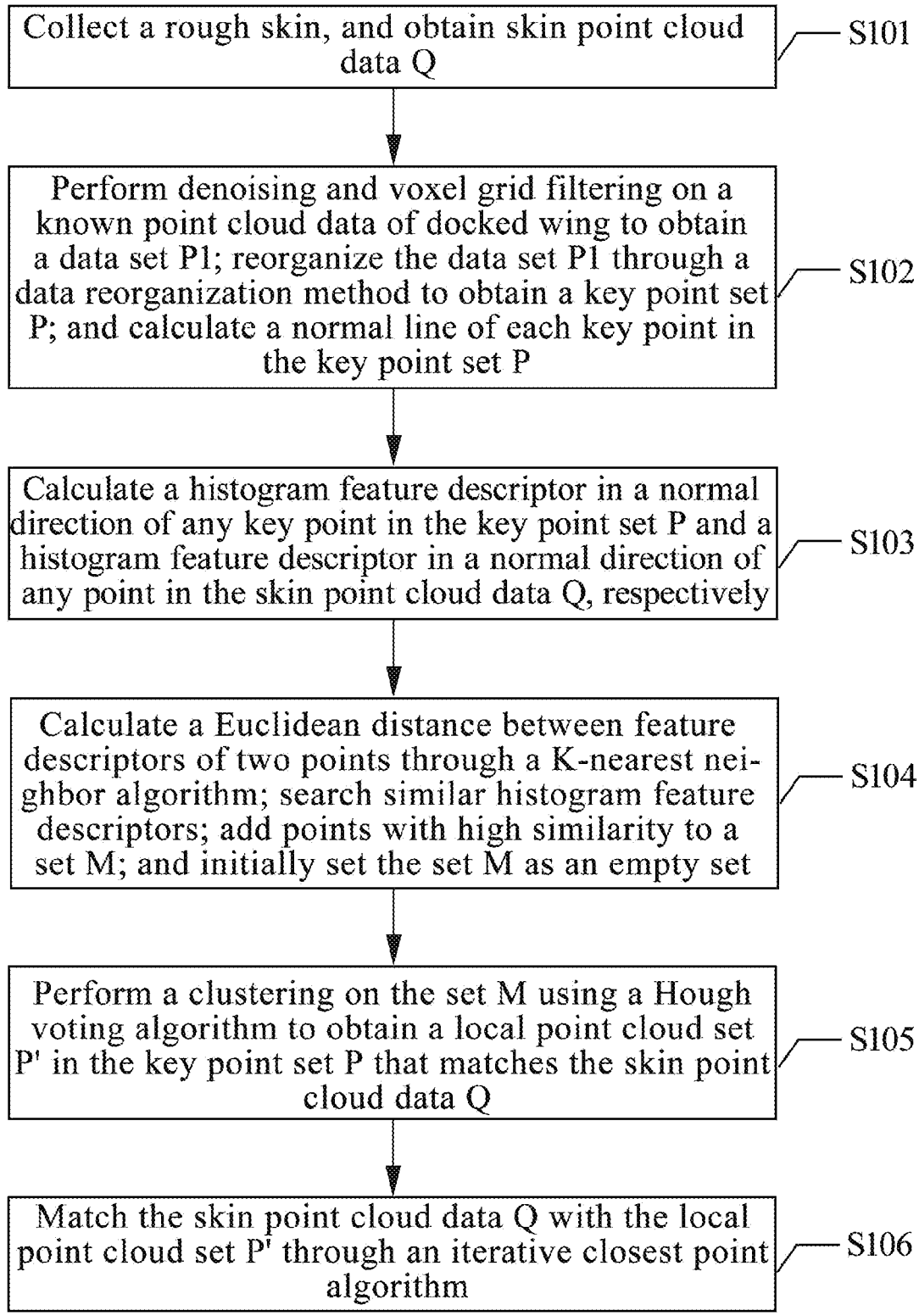
FIG. 2 is a flowchart of a method of a fairing skin registration according to an embodiment of the present disclosure.

As shown in FIGS. 1-2, the fairing skin repair method based on measured wing data includes the following steps.

S1) Fairing skin registration

S101) Skin point cloud data Q is obtained, and specifically, a skin uniformly manufactured in a factory is scanned using a three-dimensional laser scanned, so as to collect the skin point cloud data Q.

S102) Denoising and voxel grid filtering are performed on a known point cloud data of docked wing to obtain a data set P1. The data set P1 is reorganized through a data reorganization method to obtain a key point set P. Meanwhile, a normal line of each key point in the key point set P is calculated.

The step (S102) includes the following steps.

S102-1) The known point cloud data of the docked wing is preprocessed to eliminate noise points that deviate from a contour.

S102-2) The preprocessed point cloud data of the docked wing is filtered through voxel grid filtering to obtain the data set P1.

S103-3) A nearest neighbor of any key point in the data set P1 is taken, and a search is performed through a k-nearest neighbor algorithm—the data reorganization method to reorganize the data set P1 according to a tree structure, so as to obtain the key point set P.

S102-4) Dimensionality of each adjacent point of the key point set P is reduced from a three-dimensional plane to a two-dimensional plane through principal component analysis, where the two-dimensional plane is a tangent plane of the adjacent point, and a normal line of the tangent plane is the normal line of the corresponding key point.

S103) A histogram feature descriptor in a normal direction of any key point in the key point set P and a histogram feature descriptor in a normal direction of any point in the skin point cloud data Q are calculated, respectively;

The step (S103) includes the following steps.

S103-1) A local feature descriptor $m_i$, i=1, 2, 3, ..., k in a normal direction of any key point in the key point set P is calculated, where k is the number of key points in the key point set.

In this step, any key point in the key point set P is taken as a center. A spherical area is constructed with a self-set radius, and is divided into grids along three directions of radial, azimuth, and elevation. The spherical area is divided into 32 spatial areas through dividing along the radial direction 2 times, the azimuth direction 8 times, and the elevation direction 2 times.

In each spatial region, a cosine of an angle between a normal line $n_N$ of any point in the spatial region and a normal line $n_i$ of a key point $p_i$ is calculated: $\cos\theta = n_N \cdot n_i$, where N is the number of points in the spatial region.

A histogram statistic is performed on the number of points falling into each spatial region according to the cosine value to obtain the local feature descriptor $m_i$ of the normal direction of the key point.

S103-2) calculating a local feature descriptor $m_j$, j=1, 2, 3, ..., l in a normal direction of any point in the skin point cloud data Q using the same method, where l is the number of key points in the skin point cloud data Q.

S104) A Euclidean distance between feature descriptors of two points is calculated through a K-nearest neighbor algorithm. Similar histogram feature descriptors are found. Points with high similarity are added into a set M, and the set M is initially set as an empty set.

The step (S104) includes the following steps.

S104-1) The feature descriptor $m_i$ of the histogram of the key point set P is input using KdTree, and a nearest neighbor search is performed using fast library for approximate nearest neighbors (FLANK).

S104-2) Among all the points in the skin point cloud data Q, a point whose matching distance from any key point in the key point set P is less than a Euclidean distance σ is searched, that is, a feature point: σ=0.3.

S104-3) All the feature points whose matching distance is less than a are put into the set M.

S105) A clustering is performed on the set M using a Hough voting algorithm to obtain a local point cloud set P' in the key point set P that matches the skin point cloud data Q.

The step (S105) includes the following steps.

S105-1) A local reference frame for the feature points in the skin point cloud data Q and the feature points in the key point set P is calculated.

S105-2) The clustering is performed using the Hough voting algorithm. For the input feature points of the skin point cloud data Q and the input feature points of the key point set P, a size of a Hough peak point in a Hough space is set as a threshold.

S105-3) The set M is matched. According to the threshold set in step (S105-2), a final cluster set, that is, the local point cloud set P', is identified.

S106) The skin point cloud data Q is matched with the local point cloud set P' through an iterative closest point algorithm.

The step (S106) includes the following steps.

S106-1) The skin point cloud data Q is matched with the locked local point cloud set P' using the iterative closest point algorithm.

In this step, a corresponding near point, that is, a corresponding point pair of any key point in the key point set P in the skin point cloud data Q is calculated. A rigid body transformation T that minimizes an average distance of the corresponding point pair is obtained. A translation parameter ω and a rotation parameter r are obtained. The key point set P is transformed according to the translation parameter ω and a rotation parameter r to obtain a new transformed point set P″. If the new transformed point set P″ and the skin point cloud data Q satisfy that an average distance between the two point sets is less than a given threshold, a result after coarse registration will be obtained.

S106-2) Wrong points are filtered out in the coarse registration using a global hypothesis verification algorithm, so as to a skin registration.

S2) Fairing skin repair

Figure 3:
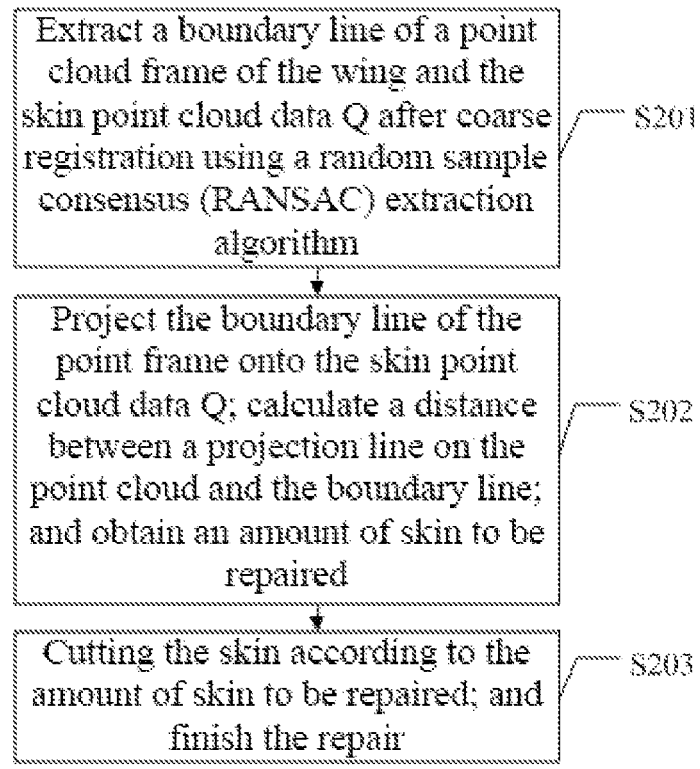
FIG. 3 is a flowchart of a method of a fairing skin repair according to an embodiment of the present disclosure.

As shown in FIG. 3, the step (S2) includes the following steps.

S201) A boundary line of a point cloud frame of the wing and the skin point cloud data Q after coarse registration is extracted using a random sample consensus (RANSAC) extraction algorithm.

S202) The boundary line of the point frame is projected onto the skin point cloud data Q. A distance between a projection line on the point cloud and the boundary line is calculated, so as to obtain an amount of skin to be repaired.

S203) The skin is cut according to the amount of skin to be repaired, and then the repair is finished.

Those skilled in the art can understand that all or part of the steps in the various methods of the above-mentioned embodiments can be completed by instructing a hardware through a program. The program can be stored in a computer-readable storage medium, and the storage medium is a read-only memory (ROM), a random-access memory (RAM), a disk or a compact disk (CD).

The above-mentioned embodiments are not intended to limit the scope of the present disclosure. For those skilled in the art, any replacements and modifications without departing from the spirit of the present disclosure should fall in the scope of the appended claims.

What is claimed is:

1. A fairing skin repair method based on measured wing data, comprising:
   S1) carrying out a fairing skin registration, comprising:
      S101) obtaining skin point cloud data Q;
      S102) performing denoising and voxel grid filtering on a known point cloud data of docked wing to obtain a data set P1; reorganizing the data set P1 through a data reorganization method to obtain a key point set P; and calculating a normal line of each key point in the key point set P;
      S103) calculating a histogram feature descriptor in a normal direction of any key point in the key point set P and a histogram feature descriptor in a normal direction of any point in the skin point cloud data Q, respectively;
      S104) calculating a Euclidean distance between feature descriptors of two points through a K-nearest neighbor algorithm; searching similar histogram feature descriptors; adding points with high similarity to a set M; and initially setting the set M as an empty set;
      S105) performing a clustering on the set M using a Hough voting algorithm to obtain a local point cloud set P' in the key point set P that matches the skin point cloud data Q; and
      S106) matching the skin point cloud data Q with the local point cloud set P' through an iterative closest point algorithm; and
   S2) carrying out a fairing skin repair.

2. The method of claim 1, wherein in step (S101), a skin uniformly manufactured in a factory is scanned using a three-dimensional laser scanner, so as to collect the skin point cloud data Q.

3. The method of claim 1, wherein the step (S102) comprises:
   S102-1) preprocessing the known point cloud data of the docked wing to eliminate noise points that deviate from a contour;
   S102-2) filtering the preprocessed point cloud data of the docked wing through voxel grid filtering to obtain the data set P1;
   S102-3) taking a nearest neighbor of any key point in the data set P1, performing a search through a k-nearest neighbor algorithm—the data reorganization method to reorganize the data set P1 according to a tree structure, so as to obtain the key point set P; and
   S102-4) reducing dimensionality of each adjacent point of the key point set P from a three-dimensional plane to a two-dimensional plane through principal component analysis; wherein the two-dimensional plane is a tangent plane of the adjacent point, and a normal line of the tangent plane is the normal line of the corresponding key point.

4. The method of claim 3, wherein the step (S103) comprises:

S103-1) calculating a local feature descriptor $m_i$, i=1, 2, 3, . . . , k in a normal direction of any key point in the key point set P, wherein k is the number of key points in the key point set;

wherein the step (S103-1) comprises:

taking any key point in the key point set P as a center; constructing a spherical area with a self-set radius; dividing grids along three directions of radial, azimuth, and elevation; wherein the spherical area is divided into 32 spatial areas through dividing along the radial direction 2 times, the azimuth direction 8 times, and the elevation direction 2 times;

in each spatial region, calculating a cosine of an angle between a normal line $n_N$ of any point in the spatial region and a normal line $n_i$ of a key point $p_i$: cos $\theta = n_N \cdot n_i$; wherein N is the number of points in the spatial region; and performing a histogram statistic on the number of points falling into each spatial region according to the cosine value to obtain the local feature descriptor $m_i$ of the normal direction of the key point;

S103-2) calculating a local feature descriptor $m_j$, j=1, 2, 3, . . . , l in a normal direction of any point in the skin point cloud data Q using a same method, wherein l is the number of key points in the skin point cloud data Q.

5. The method of claim 4, wherein the step (S104) comprises:

S104-1) inputting the local feature descriptor $m_i$ of the histogram of the key point set Pausing KdTree; and performing a nearest neighbor searching using fast library for approximate nearest neighbors (FLANK);

S104-2) among all the points in the skin point cloud data Q, searching a point whose matching distance from any key point in the key point set P is less than a Euclidean distance σ, that is, a feature point: σ=0.3; and S104-3) putting all the feature points whose matching distance is less than a into the set M.

6. The method of claim 5, wherein the step (S105) comprises:

S105-1) calculating a local reference frame for the feature points in the skin point cloud data Q and the feature points in the key point set P;

S105-2) performing a clustering using the Hough voting algorithm; for the input feature points of the skin point cloud data Q and the input feature points of the key point set P, setting a size of a Hough peak point in a Hough space as a threshold; and S105-3) matching the set M, according to the threshold set in step (S105-2), identifying a final cluster set, that is, the local point cloud set P'.

7. The method of claim 6, wherein the step (S106) comprises:

S106-1) matching the skin point cloud data Q with the locked local point cloud set P' using the iterative closest point algorithm;

wherein the step (S106-1) comprises:

calculating a corresponding near point, that is, a corresponding point pair of any key point in the key point set P in the skin point cloud data Q; obtaining a rigid body transformation T that minimizes an average distance of the corresponding point pair; obtaining a translation parameter ω and a rotation parameter r; transforming the key point set P according to the translation parameter ω and a rotation parameter r to obtain a new transformed point set P'''; wherein if the new transformed point set P''' and the skin point cloud data Q satisfy that an average distance between the two point sets is less than a given threshold, a result after coarse registration will be obtained; and S106-2) filtering out wrong points in the coarse registration using a global hypothesis verification algorithm, so as to finish a skin registration.

8. The method of claim 7, wherein the step (S2) comprises:

S201) extracting a boundary line of a point cloud frame of the wing and the skin point cloud data Q after coarse registration using a random sample consensus (RANSAC) extraction algorithm;

S202) projecting the boundary line of the point frame onto the skin point cloud data Q; calculating a distance between a projection line on the point cloud and the boundary line, so as to obtain an amount of skin to be repaired; and S203) cutting the skin according to the amount of skin to be repaired; and finishing the repair.

* * * * *